United States Patent Office 2,732,360
Patented Jan. 24, 1956

2,732,360

RUBBER COMPOSITIONS CONTAINING A SILICA AND ALKALI METAL OXIDE FILLER

Adolf Voigt, Beuel (Rhine), and Kurt Andrich, Oberursel, Germany, assignors to Deutsche Gold- und Silber-Scheideanstalt vormals Roessler, Frankfurt am Main, Germany, a corporation of Germany No Drawing. Application December 4, 1951, Serial No. 259,884

Claims priority, application Germany December 7, 1950

4 Claims. (Cl. 260—37)

The present invention relates to novel rubber compositions produced from natural or synthetic rubber or other elastomers, such as, silicone rubber, containing a special form of silica as a filler.

It has already been proposed to employ white fillers, especially silica, in rubber compositions in place of carbon black. Special effort was, however, always made to employ such fillers in as pure a form as possible.

It has now unexpectedly been found that shaped products of good mechanical properties can be obtained from rubber compositions which contrary to the previous concepts contain a silica obtained by a wet method and still contains a not insignificant water content. The water content of the silica filler can be between 2 and 20% and especially good results were obtained with water contents of 5 to 15%. Tests have shown that natural rubber vulcanizates produced with a silica filler obtained by a wet process and dehydrated to a water content below 1% had a tensile strength below 125 kg./cm.$^2$.

These vulcanizates were produced from the following recipe:

| | Parts by wt. |
|---|---|
| Natural rubber | 100 |
| Silica with water content below 1% | 40 |
| Pinetar | 4 |
| Stearic acid | 1.5 |
| ZnO | 4.94 |
| Accelerator (medium active) | 2.7 |
| Sulfur | 4.1 |

The vulcanization temperature was 134° C.

On the other hand, vulcanizates of the same recipe, but containing a silica with a 10% water content produced by a wet method as the filler had a tensile strength of at least 240 kg./cm.$^2$.

It was also found that such silica products could be used which in addition to the water content according to the invention, also have an alkali content of 1 to 10%, preferably 1 to 5% calculated as the alkali metal oxide. It was not to be anticipated that such an alkali content would produce an improvement in the mechanical properties of rubber products rather than an impairment of such properties. Rubber vulcanizates produced with silica fillers having the aforementioned alkali content have tensile strengths of about 20% greater than rubber vulcanizates produced with silica fillers devoid of alkali.

The silica employed according to the invention can be produced by conventional precipitation processes. However, it has been found especially advantageous to employ silica which has been precipitated in an alkaline medium and then washed with a dilute acid to provide the desired alkali content therein. For example, a water glass solution can be precipitated with sodium bicarbonate whereby a silica precipitate is obtained having an alkali content considerably above 10% such as, for example 14%. This precipitate is then treated with a dilute acid such as hydrochloric acid until an end pH of 4 is achieved. Upon drying at 110° C., a silica product is obtained which besides 12% of water, also contains 3% of Na$_2$O.

The fillers according to the invention are not only suited for natural and synthetic rubbers, but also for other elastomers. For example, favorable results were obtained when they were employed as fillers in silicone rubber produced by known methods. The term rubber is used herein to designate the various rubber and rubber-like materials mentioned.

Preferably the quantity of the filler in accordance with the invention is between 30 parts by weight and 60 parts by weight per 100 parts by weight of rubber.

We claim:

1. A vulcanized composition containing a rubber selected from the group consisting of natural rubber and silicone rubber and as a filler a precipitated silica with a 2 to 20% water content and a 1 to 10% alkali metal oxide content, the quantity of said filler being 30 to 60 parts by weight of the rubber.

2. A vulcanized composition containing a rubber selected from the group consisting of natural rubber and silicone rubber and as a filler a precipitated silica with a 2 to 20% water content and a 1 to 5% alkali metal oxide content, the quantity of said filler being 30 to 60 parts by weight of the rubber.

3. A vulcanized composition containing a rubber selected from the group consisting of natural rubber and silicone rubber and as a filler a precipitated silica with a 5 to 15% water content and a 1 to 5% alkali metal oxide content, the quantity of said filler being 30 to 60 parts by weight of the rubber.

4. A vulcanized composition containing a rubber selected from the group consisting of natural rubber and silicone rubber and as a filler silica precipitated in an alkaline medium and washed with a dilute acid to an alkali metal oxide content between 1 and 10%, said silica having a 2 to 20% water content, the quantity of said filler being 30 to 60 parts by weight per 100 parts by weight of the rubber.

References Cited in the file of this patent

UNITED STATES PATENTS

| 1,843,576 | McClure et al. | Feb. 2, 1932 |
| 2,502,949 | Howlett et al. | Apr. 4, 1950 |
| 2,560,043 | Schmidt | July 10, 1951 |
| 2,597,872 | Iler | May 27, 1952 |
| 2,692,870 | Pechukas | Oct. 26, 1954 |

OTHER REFERENCES

Gage et al.: India Rubber World, Aug. 1949, pages 577–581 and 586.

Gage et al.: India Rubber World, Mar. 1950, pages 669–673 and 677.

Wolf et al.: Rubber Age, June 1950, pages 315–322.